US008897337B2

(12) United States Patent  
Wu et al.

(10) Patent No.: US 8,897,337 B2  
(45) Date of Patent: Nov. 25, 2014

(54) METHOD AND DEVICE FOR ESTIMATING RATIO OF AVERAGE CHIP ENERGY TO TOTAL TRANSMIT POWER SPECTRUM DENSITY

(75) Inventors: Gengshi Wu, Shanghai (CN); Fengyu Sun, Shangahi (CN); Meng Hua, Shanghai (CN); Chunling Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 337 days.

(21) Appl. No.: 13/422,079

(22) Filed: Mar. 16, 2012

(65) Prior Publication Data

US 2012/0236908 A1    Sep. 20, 2012

(30) Foreign Application Priority Data

Mar. 18, 2011   (CN) .......................... 2011 1 0066831

(51) Int. Cl.
*H04B 1/707* (2011.01)
*H04J 13/00* (2011.01)
*H04W 52/24* (2009.01)

(52) U.S. Cl.
CPC ............ *H04J 13/0044* (2013.01); *H04B 1/707* (2013.01); *H04W 52/241* (2013.01)
USPC ....................................... 375/147

(58) Field of Classification Search
CPC ....... H04B 1/707; H04B 1/69; H04J 13/0044; H04J 13/004; H04W 52/241; H04W 52/18; H04W 52/00
USPC ......................................... 375/130, 140, 147
See application file for complete search history.

(56) References Cited

U.S. PATENT DOCUMENTS

| | | | |
|---|---|---|---|
| 7,433,310 B2 | 10/2008 | Marinier | |
| 7,653,040 B1 | 1/2010 | Moon | |
| 2004/0229628 A1* | 11/2004 | Khan | 455/452.2 |
| 2006/0018367 A1 | 1/2006 | Bui | |
| 2011/0158293 A1* | 6/2011 | Shiu et al. | 375/147 |
| 2011/0218012 A1* | 9/2011 | Nibe | 455/522 |

FOREIGN PATENT DOCUMENTS

| | | |
|---|---|---|
| CN | 1286878 A | 3/2001 |
| CN | 1383691 A | 12/2002 |
| CN | 1735083 A | 2/2006 |
| CN | 101599939 A | 12/2009 |

OTHER PUBLICATIONS

Office Action issued in corresponding Chinese Patent Application No. 201110066831.5, mailed Jan. 16, 2013.

* cited by examiner

*Primary Examiner* — Kevin M Burd

(74) *Attorney, Agent, or Firm* — Brinks Gilson & Lione

(57) ABSTRACT

The present invention provides a method for estimating a ratio of average chip energy to a total transmit power spectrum density (Ec/Ior), including: according to a group of spreading codes corresponding to an acquired spreading factor, obtaining an estimated value of Ior; according to a spreading code of a physical channel to be estimated, obtaining an estimated value of Ec; and according to the estimated value of the Ior and the estimated value of the Ec, obtaining an estimated value of EC/Ior. The present invention further provides a device for estimating Ec/Ior. By adopting the method and device for estimating Ec/Ior, when a base station adjusts transmit power of each physical channel, an adjusted value of Ec/Ior can be obtained in real time for accurate estimation.

6 Claims, 3 Drawing Sheets

METHOD AND DEVICE FOR ESTIMATING RATIO OF AVERAGE CHIP ENERGY TO TOTAL TRANSMIT POWER SPECTRUM DENSITY

CROSS-REFERENCE TO RELATED APPLICATION

This application claims priority to Chinese Patent Application No. 201110066831.5, filed on Mar. 18, 2011, which is hereby incorporated by reference in its entirety.

FIELD OF THE INVENTION

The embodiments of the present invention relate to the mobile communications technologies, and in particular, to a method and a device for estimating a ratio of average chip energy to a total transmit power spectrum density (Ec/Ior).

BACKGROUND OF THE INVENTION

Ec/Ior represents a ratio of average chip transmit energy to a transmit power spectrum density in a code domain or on a physical channel. Because a total bandwidth of a communication system is fixed, Ec/Ior in the communication system may represent a ratio of transmit energy of a single channel to total transmit power, and the transmit energy of the channel is controlled and adjusted according to a value of Ec/Ior. Currently, in an existing mobile communication technology, orthogonal codes are generally adopted to distinguish physical channels and transmitting stations from physical channels and user equipment (user equipment, hereinafter referred to as UE). In a communication system that adopts the foregoing technology, Ec/Ior of each physical channel needs to be estimated to obtain an estimated value of Ec/Ior.

In the existing mobile communication technology, according to a common setting of a base station, a fixed Ec/Ior value is adopted as an estimated value of Ec/Ior. Because the estimated value of Ec/Ior is fixed, when the base station adjusts transmit power of each physical channel, the estimated value of Ec/Ior fails to effectively track a change of the transmit power of each physical channel. Therefore, accuracy of an estimated value of Ec/Ior obtained by adopting an existing Ec/Ior estimation method is low.

SUMMARY OF THE INVENTION

Embodiments of the present invention provide a method and a device for estimating Ec/Ior, so as to accurately estimate a value of Ec/Ior.

In order to achieve the forgoing objective, the technical solutions of the present invention are implemented as follows.

An embodiment of the present invention provides a method for estimating Ec/Ior, including:

according to a group of spreading codes corresponding to an acquired spreading factor (SF), obtaining an estimated value of a total transmit power spectrum density (Ior);

according to a spreading code of a physical channel to be estimated, obtaining an estimated value of average chip transmit energy (Ec); and according to the estimated value of the Ior and the estimated value of the Ec, obtaining an estimated value of Ec/Ior.

An embodiment of the present invention further provides a device for estimating Ec/Ior, including:

a total transmit power spectrum density (Ior) estimating unit, configured to obtain an estimated value of Ior according to a group of spreading codes that are corresponding to an acquired spreading factor (SF);

an average chip transmit energy (Ec) estimating unit, configured to obtain an estimated value of Ec according to a spreading code of a physical channel to be estimated; and an Ec/Ior estimating unit, configured to obtain an estimated value of Ec/Ior according to the estimated value of the Ior and the estimated value of the Ec.

It can be seen from the foregoing technical solutions that, in the embodiments of the present invention, Ior is estimated according to a group of spreading codes that are corresponding to an acquired SF, and Ec is estimated according to a spreading code of a physical channel that is to be estimated. When a base station adjusts transmit power of each physical channel, with the method for estimating Ec/Ior in the embodiments of the present invention, for a received signal after adjustment, estimated values of Ec and Ior after adjustment can be obtained in real time by using spreading codes. Therefore, a change of transmit power of a physical channel can be effectively tracked to accurately estimate a value of Ec/Ior, thus improving accuracy of an estimated result of Ec/Ior.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art can still derive other drawings from these accompanying drawings without creative efforts.

DETAILED DESCRIPTION OF THE EMBODIMENTS

In order to make the objectives, technical solutions, and advantages of the present invention clearer, the technical solutions in the embodiments of the present invention are clearly and completely described in the following with reference to the accompanying drawings in the embodiments of the present invention. Apparently, the embodiments in the following description are merely a part rather than all of the embodiments of the present invention. Based on the embodiments of the present invention, all other embodiments obtained by persons of ordinary skill in the art without creative efforts shall fall within the protection scope of the present invention.

In the embodiments of the present invention, when Ior is estimated, a spreading factor (Spreading Factor, hereinafter referred to as SF) of a spreading code that is used for despreading is acquired, and according to a group of spreading codes corresponding to the SF, an estimated value of Ior is obtained; when Ec is estimated, according to a spreading code of a physical channel to be estimated, an estimated value of Ec is obtained; and according to the estimated value of the Ior and the estimated value of the Ec, an estimated value of Ec/Ior is calculated.

A method for estimating Ec/Ior in the present invention is described in the following through two embodiments.

Figure 1:
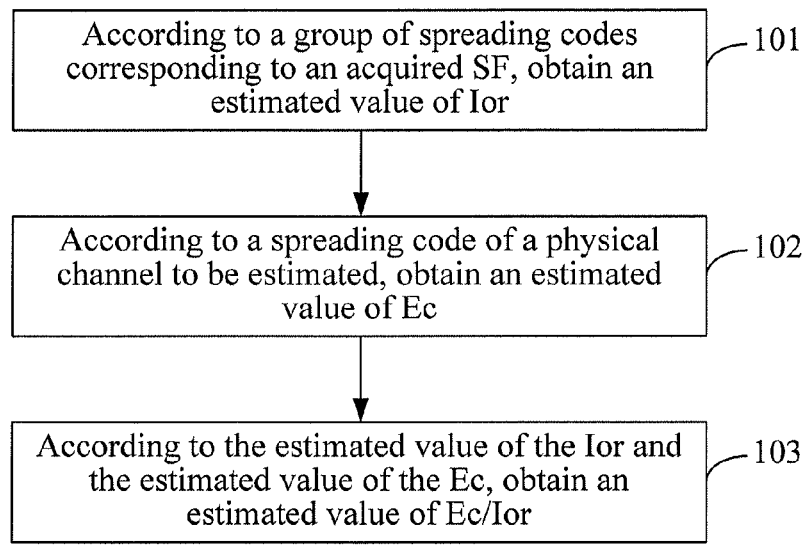
FIG. 1 is a schematic flow chart of a method for estimating Ec/Ior according to a first embodiment of the present invention.

FIG. 1 is a schematic flow chart of a method for estimating Ec/Ior according to a first embodiment of the present invention. As shown in FIG. 1, the method includes the following steps.

Step 101: According to a group of spreading codes corresponding to an acquired SF, obtain an estimated value of Ior.

Step 102: According to a spreading code of a physical channel to be estimated, obtain an estimated value of Ec.

Step 103: According to the estimated value of the Ior and the estimated value of the Ec, obtain an estimated value of Ec/Ior.

In the foregoing steps 101 to 103, a sequence of step 101 and step 102 may be changed. Step 102 may be performed before, after, or simultaneously with step 101. Step 103 is performed after step 101 and step 102 are performed.

In the first embodiment of the present invention, Ior is estimated according to a group of spreading codes that are corresponding to an acquired SF, and Ec is estimated according to a spreading code of a physical channel that is to be estimated. When a base station adjusts transmit power of each physical channel, with the method for estimating Ec/Ior in this embodiment of the present invention, for a received signal after adjustment, estimated values of Ec and Ior after adjustment can be obtained in real time by using spreading codes. Therefore, a change of transmit power of a physical channel can be effectively tracked to accurately estimate a value of Ec/Ior, thus improving accuracy of an estimated result of Ec/Ior.

Figure 2:
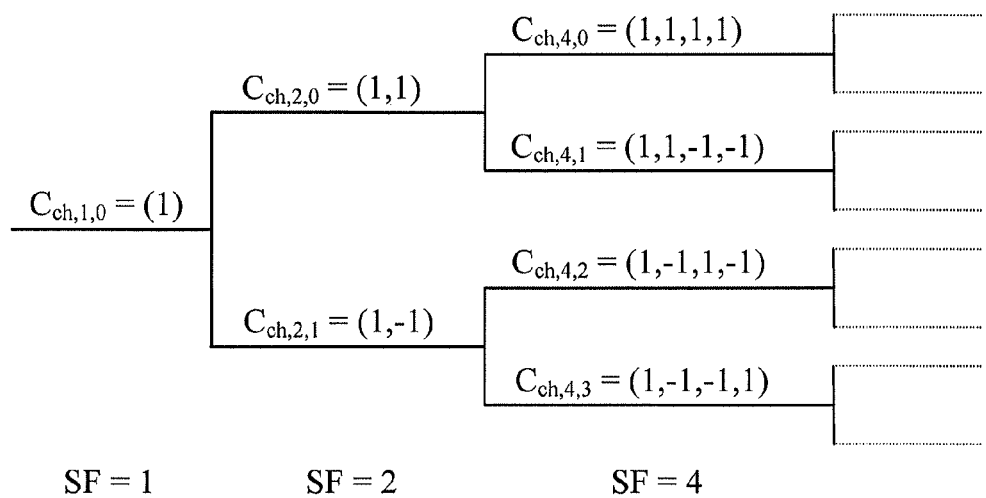
FIG. 2 is a schematic structural diagram of a code tree of orthogonal variable spreading factor (Orthogonal Variable Spreading Factor, hereinafter referred to as OVSF) codes according to a second embodiment of the present invention.

In a second embodiment, a wideband code division multiple access (Wideband Code Division Multiple Access, hereinafter referred to as WCDMA) communication system is taken as an example. In the WCDMA communication system, an OVSF code is used as a channel code. Therefore, in the second embodiment of the present invention, a group of spreading codes corresponding to an SF are OVSF codes. FIG. 2 is a schematic structural diagram of a code tree of OVSF codes according to the second embodiment of the present invention. As shown in FIG. 2, in an OVSF code tree, $C_{ch,SF,k}$ represents a code word, where ch represents a channel sequence number, SF represents a spreading factor of the code word, k represents a serial number of the code word, and $0 \leq k \leq SF-1$. In a first level of the code tree, SF=1 and a channel code is $C_{ch,1,0}=(1)$. A channel code of each subsequent level is generated from a channel code of a higher level of the each subsequent level. A specific generation method of the OVSF code may be described in the following formula:

$$C_{ch,1,0} = 1$$

$$\begin{bmatrix} C_{ch,2,0} \\ C_{ch,2,1} \end{bmatrix} = \begin{bmatrix} C_{ch,1,0} & C_{ch,1,0} \\ C_{ch,1,0} & -C_{ch,1,0} \end{bmatrix} = \begin{bmatrix} 1 & 1 \\ 1 & -1 \end{bmatrix}$$

-continued $$\begin{bmatrix} C_{ch,2^{(n+1)},0} \\ C_{ch,2^{(n+1)},1} \\ C_{ch,2^{(n+1)},2} \\ C_{ch,2^{(n+1)},3} \\ \vdots \\ C_{ch,2^{(n+1)},2^{(n+1)}-2} \\ C_{ch,2^{(n+1)},2^{(n+1)}-1} \end{bmatrix} = \begin{bmatrix} C_{ch,2^n,0} & C_{ch,2^n,0} \\ C_{ch,2^n,0} & -C_{ch,2^n,0} \\ C_{ch,2^n,1} & C_{ch,2^n,1} \\ C_{ch,2^n,1} & -C_{ch,2^n,1} \\ \vdots & \vdots \\ C_{ch,2^n,2^n-1} & C_{ch,2^n,2^n-1} \\ C_{ch,2^n,2^n-1} & -C_{ch,2^n,2^n-1} \end{bmatrix}$$

In the second embodiment of the present invention, the group of spreading codes that are corresponding to the acquired SF are OVSF codes in a code tree structure shown in FIG. 2.

Figure 3:
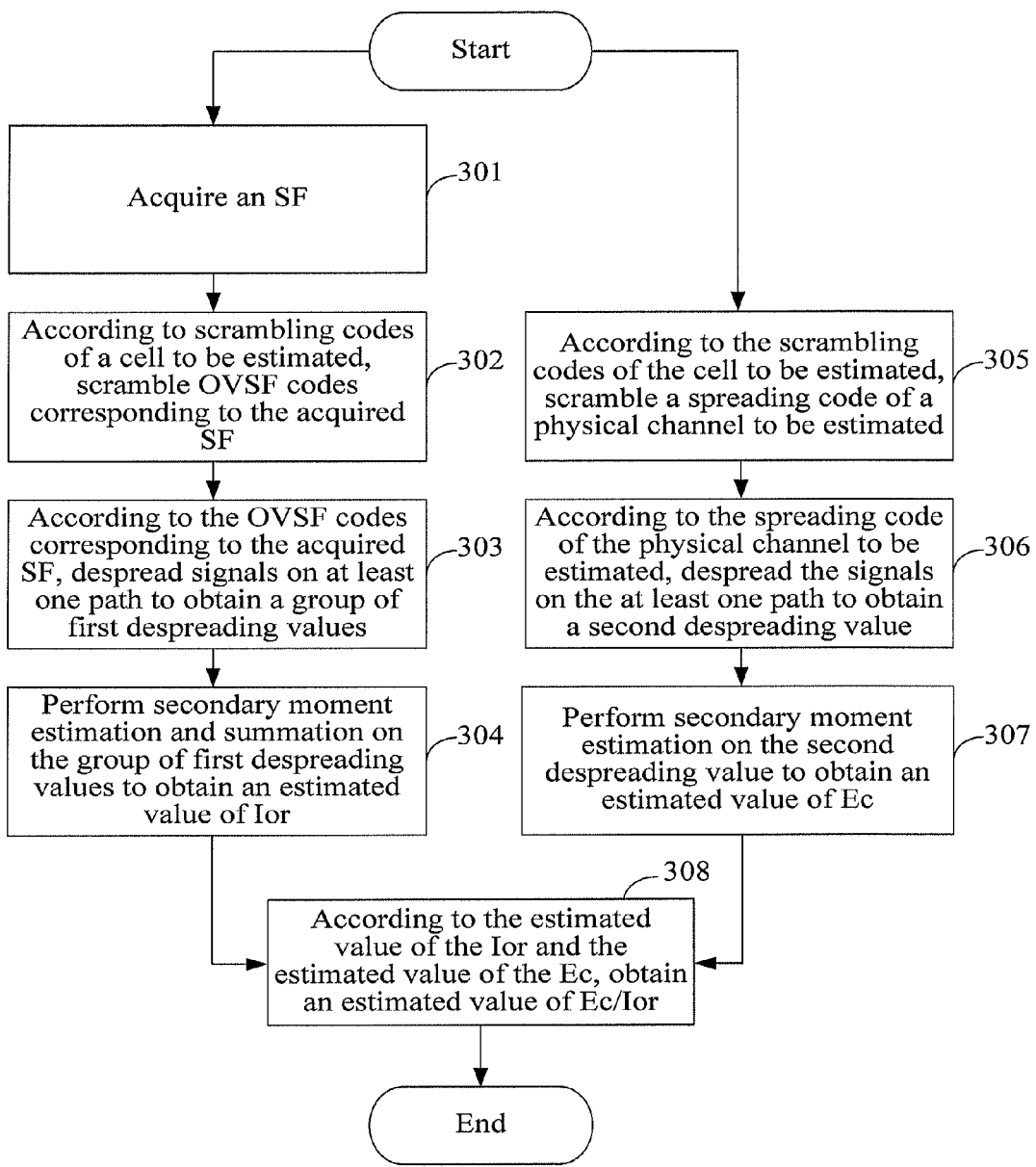
FIG. 3 is a schematic flow chart of a method for estimating Ec/Ior according to the second embodiment of the present invention.

FIG. 3 is a schematic flow chart of a method for estimating Ec/Ior according to the second embodiment of the present invention. As shown in FIG. 3, the method specifically includes the following steps.

Step 301: Acquire an SF.

The method for estimating Ec/Ior in this embodiment of the present invention needs to estimate Ior according to an acquired SF. Therefore, when the SF is not acquired, the method for estimating Ec/Ior in this embodiment of the present invention may further include a step of acquiring an SF before Ior is estimated. When an SF has been acquired, this step may not be performed, and step 302 is directly performed.

A specific method for acquiring an SF includes: according to a protocol corresponding to a communication system, obtaining an SF value, where the SF value is greater than or equal to a minimum SF value of a common channel, and the minimum SF value of the common channel is specified by the protocol. For example, according to specification of an OVSF code, an SF value is integral power of 2, that is, $SF=2^x$, where x is an integer, and a range of x is determined by the protocol. A WCDMA system is still taken as an example. According to a protocol corresponding to the WCDMA system, quite few channels with SF<16 are used in the WCDMA system, and a minimum SF value of a common channel that is specified by the protocol is 16. Therefore, in the method for estimating Ec/Ior in this embodiment of the present invention, in step 301, the SF is greater than or equal to 16. For another communication system, according to a specific protocol corresponding to the communication system, an SF value applicable to a method for estimating Ec/Ior of the communication system may be acquired.

After the SF is acquired in step 301, according to a group of spreading codes corresponding to the acquired SF, an estimated value of Ior is obtained. Specifically, steps 302 to 304 in the following may be included.

Step 302: According to scrambling codes of a cell to be estimated, scramble OVSF codes corresponding to the acquired SF.

In step 302, a specific method for scrambling the OVSF codes corresponding to the acquired SF, according to the scrambling codes of the cell to be estimated, is not limited. Any method that is capable of completing a scrambling operation is applicable. A common scrambling method is: multiplying, one by one correspondingly, the OVSF codes corresponding to the SF by the scrambling codes of the cell to be estimated.

In a WCDMA communication system, a transmitted signal symbol is a scrambled signal symbol. In a down link, a channel code is used to distinguish different channels and a scrambling code is used to scramble the channel code so as to distinguish different cells. Therefore, after a scrambled signal is received, the scrambled signal needs to be descrambled. In step 302, the OVSF codes corresponding to the acquired SF are scrambled according to the scrambling codes of the cell to be estimated. In a subsequent step, scrambled OVSF codes are directly used to complete a descrambling process. For another communication system where a transmitted signal is not scrambled, step 302 may not be preformed and step 303 is directly performed.

Step 303: According to the OVSF codes corresponding to the acquired SF, despread signals on at least one path to obtain a group of first despreading values.

In step 303, a specific method for despreading the signals on at least one path, according to the OVSF codes corresponding to the acquired SF, is not limited. Any method that is capable of completing a despreading operation is applicable. A common despreading method is: in a symbol duration period, multiplying, one by one correspondingly, the OVSF codes corresponding to the SF by chips of signals on a path to be despread, summating products, and using a summated result as a despreading value.

When the foregoing step 302 is performed, specifically, step 303 is: According to the scrambled OVSF codes corresponding to the acquired SF, descramble and despread signals on at least one path. In this circumstance, the group of first despreading values is a group of first descrambling and despreading values.

Specifically, despreading paths may be selected in multiple ways. Only three specific implementation manners are introduced in the following. Manner 1: Despread signals on a path with the highest receiving power. Manner 2: Despread signals on all paths, and then perform weighting and summation. Manner 3: Despread signals on one or more than one specified paths, and then perform weighting and summation. A weight value of the weighting may be calculated in multiple ways, where a specific implementation manner is using a signal-to-noise ratio of a path as a weight value. The foregoing three manners for selecting a despreading path are not limited to calculation of the first descrambling and despreading values, and are also applicable to calculating a second descrambling and despreading value.

Step 304: Perform secondary moment estimation and summation on the group of first despreading values to obtain an estimated value of Ior.

When the foregoing step 302 is performed, specifically, step 304 is: Perform secondary moment estimation on the group of first descrambling and despreading values to obtain an estimated value of Ior.

In step 304, two manners may be specifically adopted to obtain the estimated value of the Ior. In a first manner, only biased estimation is performed on the Ior, and a biased estimated value of the Ior is used as the estimated value of the Ior. In a second manner, a process of obtaining the estimated value of the Ior includes two steps, that is, biased estimation of the Ior and unbiased estimation of the Ior. After a biased estimated value of the Ior is obtained, unbiased estimation is further performed on the Ior, and an unbiased estimated value of the Ior is used as the estimated value of the Ior.

A specific example where only signals on a path with the highest receiving power are despread, and according to an obtained first despreading value, biased estimation and unbiased estimation are performed on the Ior in sequence is used to describe step 304 in detail in the following.

First, according to $$Ior' = \frac{1}{M}\sum_{k=0}^{M-1}\sum_{n=1}^{L/M} A^2_{chscr,M,k,l,n},$$

calculate a biased estimated value of the Ior.

Ior' is a biased estimated value of the Ior, $A_{chscr,M,k,l,n}$ is a group of first despreading values, chscr is a despreading channel identifier, M is an SF value, k is a serial number of an OVSF code, where k=0, 1, 2, . . . , and (M−1), 1 is a serial number of the path with the highest receiving power, n is a serial number of a symbol sequence that is used for descrambling and despreading, L is the number of chips required for single estimation of the Ior, and L is a positive integral multiple of M. A value of L is a common multiple of a maximum SF value, that is, the value of L is a multiple of a maximum SF value, where the maximum SF value is specified by a protocol of a communication system. For the WCDMA system, in an implementation manner, a value of L may be 2560 or 5120.

If the foregoing first method for obtaining the estimated value of the Ior is adopted, the biased estimated value of the Ior is used as the estimated value of the Ior. If the foregoing second method for obtaining the estimated value of the Ior is adopted, because the biased estimated value of the Ior has an error, after the biased estimated value of the Ior is obtained, an unbiased estimated value of the Ior is calculated according to Ior*=Ior'−L×$P_{noise,chip,1}$. The unbiased estimated value of the Ior is the obtained estimated value of the Ior. Ior* is the unbiased estimated value of the Ior and $P_{noise,chip,1}$ is chip-level interference signal energy on an acquired path with the highest receiving power. $P_{noise,chip,1}$ may be obtained directly from an existing process of calculating interference signal power.

The foregoing steps 301 to 304 are performed to obtain the estimated value of the Ior. In another aspect, an estimated value of Ec further needs to be obtained according to a spreading code of a physical channel to be estimated. Specifically, the following steps 305 to 307 may be included. Steps 305 to 307 may be performed before, after, or simultaneously with steps 301 to 304.

Step 305: According to the scrambling codes of the cell to be estimated, scramble a spreading code of a physical channel to be estimated.

In step 305, a specific method for scrambling the spreading code of the physical channel to be estimated, according to the scrambling codes of the cell to be estimated, is not limited. Any method that is capable of completing a scrambling operation is applicable. A common scrambling method is: multiplying, one by one correspondingly, the spreading code of the physical channel to be estimated by the scrambling codes of the cell to be estimated.

In the WCDMA communication system, a transmitted signal symbol is a scrambled signal symbol. Therefore, after a scrambled signal is received, the scrambled signal needs to be descrambled. In step 305, the spreading code of the physical channel to be estimated is scrambled according to the scrambling codes of the cell to be estimated. In a subsequent step, a scrambled spreading code is directly used to complete a descrambling process. For another communication system where a transmitted signal is not scrambled, step 305 may not be performed and step 306 is directly performed.

Step 306: According to the spreading code of the physical channel to be estimated, despread the signals on the at least one path to obtain a second despreading value.

In step 306, specifically, the at least one path is the path in step 303. In step 306, the signals on the path adopted in step 303 are despread to obtain the second despreading value. An implementation manner is: A path with the highest receiving power is adopted in both step 303 and step 306, and signals on the path with the highest receiving power are despread. Furthermore, in the second embodiment of the present invention, a specific method for despreading the signals on the at least one path according to the spreading code of the physical channel to be estimated is not limited. Any method that is capable of completing a despreading operation is applicable. A common despreading method is: in a symbol duration period, multiplying the spreading code of the physical channel to be estimated by chips of the signals on the at least one path one by one correspondingly, summating products, and using a summated result as a despreading value.

When the foregoing step 305 is performed, specifically, step 306 is: According to the scrambled spreading code of the physical channel to be estimated, descramble and despread the signals on the path with the highest receiving power. In this circumstance, the second despreading value is a second descrambling and despreading value.

Step 307: Perform secondary moment estimation on the second despreading value to obtain an estimated value of Ec.

When the foregoing step 305 is performed, specifically, step 307 is: Perform secondary moment estimation on the second descrambling and despreading value to obtain an estimated value of Ec.

In step 307, two manners may be specifically adopted to obtain the estimated value of the Ec. In a first manner, only biased estimation is performed on the Ec, and a biased estimated value of the Ec is used as the estimated value of the Ec. In a second manner, a process of obtaining the estimated value of the Ec includes two steps, that is, biased estimation of the Ec and unbiased estimation of the Ec. After a biased estimated value of the Ec is obtained, unbiased estimation is further performed on the Ec, and an unbiased estimated value of the Ec is used as the estimated value of the Ec.

A specific example where only biased estimation and unbiased estimation are performed on the Ec in sequence is used to describe step 307 in detail in the following.

First, according to $$Ec' = \frac{1}{Q} \sum_{n=1}^{L/Q} B^2_{chscr,Q,j,l,n},$$

calculate a biased estimated value of the Ec.

Ec' is a biased estimated value of the Ec, $B_{chscr,Q,j,l,n}$ is a second despreading value, chscr is a serial number of a despreading channel, Q is a spreading factor of a physical channel to be estimated, j is a serial number of a channel code that is selected by the physical channel to be estimated, where $0 \leq j \leq Q-1$, l is a serial number of the path with the highest receiving power, n is a serial number of a symbol sequence that is used for descrambling and despreading, L is the number of chips required for single estimation of the Ec, and L is a positive integral multiple of Q. A value of L is a common multiple of a maximum SF value, that is, the value of L is a multiple of a maximum SF value, where the maximum SF value is specified by a protocol of a communication system. For the WCDMA system, in an implementation manner, a value of L may be 2560 or 5120.

The biased estimated value of the Ec has an error. Therefore, after the biased estimated value of the Ec is obtained, an unbiased estimated value of the Ec is calculated according to $Ec^* = Ec' - (L/Q) \times P_{noise,Ec}$. The unbiased estimated value of the Ec is the obtained estimated value of the Ec.

$Ec^*$ is the unbiased estimated value of the Ec and $P_{noise,Ec}$ is interference signal energy of an acquired physical channel to be estimated. $P_{noise,Ec}$ may be obtained directly from an existing process of calculating interference signal power.

Step 308: According to the estimated value of the Ior and the estimated value of the Ec, obtain an estimated value of Ec/Ior.

The estimated value of the Ior, Ior*, is obtained in step 304, the estimated value of the Ec, Ec*, is obtained in step 307, and a ratio of the estimated value of the Ec to the estimated value of the Ior, that is, an eventually obtained estimated value of Ec/Ior of a target physical channel of a cell to be estimated in this embodiment of the present invention, is calculated in step 308.

In the second embodiment of the present invention, Ec and Ior are estimated according to OVSF codes corresponding to an acquired SF. A received signal is despread according to an OVSF code and secondary moment estimation is performed on a despreading value to complete estimation of the Ior. Therefore, when a base station adjusts transmit power of each physical channel, a change of transmit power of a physical channel can be effectively tracked to accurately estimate a value of Ec/Ior. Furthermore, by scrambling an OVSF code that is used for despreading before despreading, and performing descrambling and despreading according to a scrambled OVSF code, different scrambling codes can be used to distinguish cells, thus avoiding an adverse effect of interference signals between cells on an estimated result of Ec/Ior. Moreover, unbiased estimation is performed on the Ec and Ior according to interference signal intensity, and an estimated result of Ec/Ior is obtained according to an unbiased estimated result. Therefore, the adverse effect of the interference signals on the estimated result of the Ec/Ior is eliminated, so that accuracy of the estimated result of the Ec/Ior is further improved.

It should be noted that, to facilitate the description, the foregoing method embodiments are all expressed as a combination of a series of actions, but persons skilled in the art should know that, according to the present invention, some steps may be performed in other sequences or simultaneously, and therefore, the present invention is not limited to the described sequence of actions. Next, persons skilled in the art should also know that, the embodiments described in the specification are all exemplary embodiments, and related actions and modules are not necessarily required by the present invention.

In the forgoing embodiments, a description for each embodiment has respective emphases, and a part that is not described in detail in an embodiment may be referred to a relevant description in other embodiments.

The methods in the first embodiment and the second embodiment of the present invention may be implemented by a device for estimating Ec/Ior provided in a third embodiment of the present invention.

Figure 4:
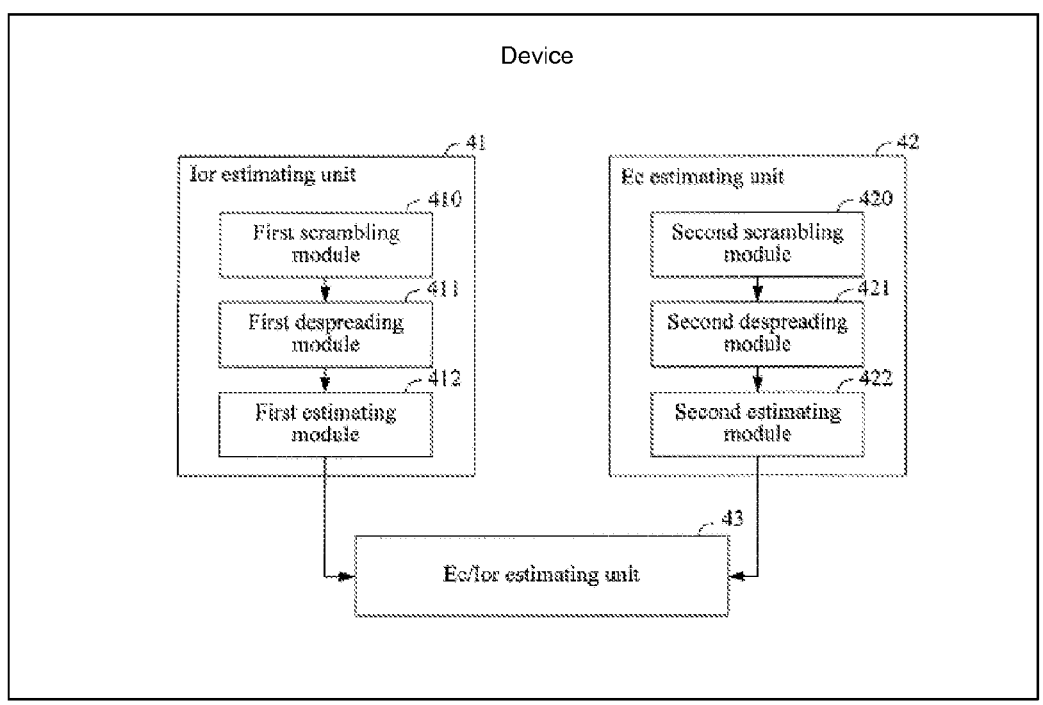
FIG. 4 is a schematic structural diagram of a device for estimating Ec/Ior according to a third embodiment of the present invention.

FIG. 4 is a schematic structural diagram of a device for estimating Ec/Ior according to the third embodiment of the present invention. As shown in FIG. 4, the device for estimating Ec/Ior includes at least an Ior estimating unit 41, an Ec estimating unit 42, and an Ec/Ior estimating unit 43.

The Ior estimating unit 41 is configured to obtain an estimated value of Ior according to a group of spreading codes that are corresponding to an acquired spreading factor (SF), and send the estimated value of the Ior to the Ec/Ior estimating unit 43. Furthermore, the Ior estimating unit 41 is further configured to obtain an SF value according to a protocol that is corresponding to a communication system, where the SF value is greater than or equal to a minimum SF value of a common channel, where the minimum SF value of the common channel is specified by a protocol.

Specifically, the Ior estimating unit 41 includes at least: a first despreading module 411 and a first estimating module 412. The first despreading module 411 is configured to despread signals on at least one path according to OVSF codes that are corresponding to an acquired SF, obtain a group of first despreading values, and send the group of first despreading values to the first estimating module 412. The first estimating module 412 is configured to receive the group of first despreading values from the first despreading module 411, and perform secondary moment estimation on the group of first despreading values to obtain an estimated value of the Ior.

Specifically, the first estimating module 412 may perform only biased estimation on the Ior, and use a biased estimated value of the Ior as the estimated value of the Ior. The first estimating module 412 may also perform biased estimation on the Ior first, and after obtaining a biased estimated value of the Ior, further perform unbiased estimation on the Ior, and use an unbiased estimated value of the Ior as the estimated value of the Ior. A specific example where signals on a path with the highest receiving power are despread, and according to an obtained first despreading value, biased estimation and unbiased estimation are performed on the Ior in sequence is used for description. Specifically, the first estimating module 412 calculates a biased estimated value of the Ior according to $$Ior' = \frac{1}{M} \sum_{k=0}^{M-1} \sum_{n=1}^{L/M} A^2_{chscr,M,k,l,n},$$

where Ior' is a biased estimated value of the Ior, $A_{chscr,M,k,l,n}$ is a group of first despreading values, chscr is a despreading channel identifier, M is an SF value, k is a serial number of an OVSF code, where k=0, 1, 2, . . . , and (M−1), l is a serial number of the path with the highest receiving power, n is a serial number of a symbol sequence that is used for descrambling and despreading, L is the number of chips required for single estimation of the Ior, and L is a positive integral multiple of M; and according to Ior*=Ior'−L×$P_{noise,chip,l}$, calculates an unbiased estimated value of the Ior, where Ior* is an unbiased estimated value of the Ior and $P_{noise,chip,l}$ is chip-level interference signal energy on an acquired path with the highest receiving power.

On a basis that the Ior estimating unit 41 includes the first despreading module 411 and the first estimating module 412, the Ior estimating unit 41 may further include: a first scrambling module 410, configured to scramble, according to scrambling codes of a cell to be estimated, OVSF codes corresponding to an acquired SF. The first despreading module 411 is specifically configured to descramble and despread signals on the path with the highest receiving power according to scrambled OVSF codes that are corresponding to the acquired SF to obtain first descrambling and despreading values. The first estimating module 412 is configured to receive a group of first descrambling and despreading values from the first despreading module 411, and perform secondary moment estimation on the group of first descrambling and despreading values to obtain an estimated value of the Ior.

The Ec estimating unit 42 is configured to obtain an estimated value of Ec according to a spreading code of a physical channel to be estimated, and send the estimated value of the Ec to the Ec/Ior estimating unit 43.

Specifically, the Ec estimating unit 42 includes at least: a second despreading module 421 and a second estimating nodule 422. The second despreading module 421 is configured to despread the signals on the at least one path according to a spreading code of a physical channel to be estimated, obtain a second despreading value, and send the second despreading value to the second estimating module 422. The second estimating module 422 is configured to receive the second despreading value from the second despreading module 421, and perform secondary moment estimation on the second despreading value to obtain an estimated value of the Ec.

Specifically, the second despreading module 421 is configured to despread signals on a path with the highest receiving power according to the spreading code of the physical channel to be estimated, obtain a second despreading value, and send the second despreading value to the second estimating module 422. The second estimating module 422 may perform only biased estimation on the Ec, and use a biased estimated value of the Ec as an estimated value of the Ec. The second estimating module 422 may also perform biased estimation on the Ec first, after obtaining a biased estimated value of the Ec, further perform unbiased estimation on the Ec, and use an unbiased estimated value of the Ec as the estimated value of the Ec. A specific example where biased estimation and unbiased estimation are performed on the Ec in sequence is used for description. Specifically, the second estimating module 422 calculates a biased estimated value of the Ec according to $$Ec' = \frac{1}{Q} \sum_{n=1}^{L/Q} B^2_{chscr,Q,j,l,n},$$

where Ec' is a biased estimated value of the Ec, $B_{chscr,Q,j,l,n}$ is a second despreading value, chscr is a despreading channel identifier, Q is a spreading factor of a physical channel to be estimated, j is a serial number of a channel code that is selected by the physical channel to be estimated, where 0≤j≤Q−1, l is a serial number of the path with the highest receiving power, n is a serial number of a symbol sequence that is used for descrambling and despreading, L is the number of chips required for single estimation of the Ec, and L is a positive integral multiple of Q; and according to Ec*=Ec'−(L/Q)×$P_{niose,Ec}$, calculates an unbiased estimated value of the Ec, where Ec* is an unbiased estimated value of the Ec and $P_{noise,Ec}$ is interference signal energy of an acquired physical channel to be estimated.

On a basis that the Ec estimating unit 42 includes a second despreading module 421 and a second estimating module 422, the Ec estimating unit 42 may further include: a second scrambling module 420, configured to scramble, according to scrambling codes of a cell to be estimated, a spreading code of a physical channel to be estimated. The second despreading module 421 is specifically configured to descramble and despread signals on the path with the highest receiving power according to a scrambled spreading code of the physical channel to be estimated to obtain a second descrambling and despreading value. The second estimating module 422 is configured to receive the second descrambling and despreading value from the second despreading module 421, and perform secondary moment estimation on the second descrambling and despreading value to obtain an estimated value of the Ec.

The Ec/Ior estimating unit 43 is configured to respectively receive the estimated value of the Ior from the Ior estimating unit 41 and the estimated value of the Ec from the Ec estimating unit 42, and obtain an estimated value of Ec/Ior according to the estimated value of the Ior and the estimated value of the Ec.

In the third embodiment of the present invention, the device for estimating Ec/Ior estimates Ec and Ior according to OVSF codes that are corresponding to an acquired SF. The Ior estimating unit despreads a received signal according to an OVSF code and performs secondary moment estimation on a despreading value to complete estimation of the Ior. Therefore, when a base station adjusts transmit power of each physical channel, an adjusted estimated value of the Ior can be obtained in real time according to an adjusted received signal. Therefore, a change of transmit power of a physical channel can be effectively tracked to accurately estimate a value of Ec/Ior. Furthermore, the Ior estimating unit scrambles a spreading code that is used for despreading before despreading, and performs descrambling and despreading according to a scrambled spreading code. Therefore, different scrambling codes can be used to distinguish cells, thus avoiding an adverse effect of interference signals between cells on an estimated result of Ec/Ior. Moreover, the Ior estimating unit and the Ec estimating unit perform unbiased estimation on the Ior and Ec according to interference signal intensity, and obtain an estimated result of Ec/Ior according to an unbiased estimated result. Therefore, the adverse effect of the interference signals on the estimated result of the Ec/Ior is eliminated, so that accuracy of the estimated result of the Ec/Ior is further improved.

Finally, it should be noted that the foregoing embodiments are merely used for describing the technical solutions of the present invention, but are not intended to limit the present invention. It should be understood by persons of ordinary skill in the art that although the present invention has been described in detail with reference to the foregoing embodiments, modifications may still be made to the technical solutions described in the foregoing embodiments, or equivalent replacements may be made to some technical features in the technical solutions, however, these modifications or replacements do not make the essence of corresponding technical solutions depart from the spirit and scope of the technical solutions in the embodiments of the present invention.

What is claimed is:

1. A method for estimating a ratio of average chip energy to a total transmit power spectrum density (Ec/Ior), comprising:
   according to a group of spreading codes corresponding to an acquired spreading factor (SF), obtaining an estimated value of a total transmit power spectrum density (Ior);
   according to a spreading code of a physical channel to be estimated, obtaining an estimated value of average chip transmit energy (Ec); and
   according to the estimated value of the Ior and the estimated value of the Ec, obtaining an estimated value of Ec/Ior;
   according to a protocol that is corresponding to a communication system, obtaining an SF value, wherein the SF value is greater than or equal to a minimum SF value of a common channel, wherein the minimum SF value of the common channel is specified by the protocol;
   wherein the obtaining the estimated value of the Ior according to the group of spreading codes corresponding to the acquired SF comprises:
   according to the group of spreading codes corresponding to the acquired SF, despreading signals on at least one path to obtain a group of first despreading values; and
   performing secondary moment estimation and summation on the group of first despreading values to obtain an estimated value of Ior, wherein the performing secondary moment estimation and summation on the group of first despreading values to obtain the estimated value of the Ior comprises:
   performing secondary moment estimation and summation according to the group of first despreading values to obtain a biased estimated value of the Ior; or
   performing secondary moment estimation and summation according to the group of first despreading values to obtain a biased estimated value of the Ior; and according to the biased estimated value of the Ior and a sum of interference signal energy of more than one physical channels, obtaining an unbiased estimated value of the Ior;
   wherein the despreading the signals on the at least one path to obtain the group of first despreading values according to the group of spreading codes corresponding to the acquired SF comprises:
   according to the group of spreading codes corresponding to the acquired SF, despreading signals on a path with the highest receiving power to obtain the group of first despreading values;
   the performing secondary moment estimation and summation according to the group of first despreading values to obtain the biased estimated value of the Ior comprises:
   according to $$Ior' = \frac{1}{M}\sum_{k=0}^{M-1}\sum_{n=1}^{L/M} A^2_{chscr,M,k,l,n},$$

calculating a biased estimated value of the Ior, wherein Ior' is a biased estimated value of the Ior, $A_{chscr,M,k,l,n}$ is a group of first despreading values, chscr is a despreading channel identifier, M is an SF value, k is a serial number of a spreading code, wherein k =0, 1, 2, ..., and (M−1), l is a serial number of the path with the highest receiving power, n is a serial number of a symbol sequence that is used for despreading, L is the number of chips required for single estimation of the Ior, and L is a positive integral multiple of M; and
the obtaining the unbiased estimated value of the Ior according to the biased estimated value of the Ior and the sum of interference signal energy of more than one physical channels comprises:
according to Ior*=Ior'−L×$P_{noise,chip,1}$ calculating an unbiased estimated value of the Ior, wherein Ior* is an unbiased estimated value of the Ior and $P_{noise,chip,1}$ is chip-level interference signal energy of an acquired path with the highest receiving power.

2. The method according to claim 1, wherein
before the despreading the signals on the at least one path according to the group of spreading codes corresponding to the acquired SF, the method further comprises:
according to scrambling codes of a cell to be estimated, scrambling the group of spreading codes corresponding to the acquired SF;

the despreading the signals on the at least one path according to the group of spreading codes corresponding to the acquired SF comprises: according to a scrambled group of spreading codes corresponding to the acquired SF, descrambling and despreading the signals on the at least one path; and the first despreading values are first descrambling and despreading values.

3. The method according to claim 1, wherein
the obtaining the estimated value of the average chip energy (Ec) according to the spreading code of the physical channel to be estimated comprises:
according to the spreading code of the physical channel to be estimated, despreading the signals on the at least one path to obtain a second despreading value; and
performing secondary moment estimation on the second despreading value to obtain an estimated value of the Ec.

4. The method according to claim 3, wherein
before the despreading the signals on the at least one path according to the spreading code of the physical channel to be estimated, the method further comprises: according to scrambling codes of a cell to be estimated, scrambling the spreading code of the physical channel to be estimated;
the despreading the signals on the at least one path according to the spreading code of the physical channel to be estimated comprises: according to a scrambled spreading code of the physical channel to be estimated, descrambling and despreading the signals on the at least one path; and
the second despreading value is a second descrambling and despreading value.

5. The method according to claim 3 or 4, wherein the performing secondary moment estimation on the second despreading value to obtain the estimated value of the Ec comprises:
performing secondary moment estimation according to the second despreading value to obtain a biased estimated value of the Ec;
or,
performing secondary moment estimation according to the second despreading value to obtain a biased estimated value of the Ec; and according to the biased estimated value of the Ec and chip-level interference signal energy of the physical channel to be estimated, obtaining an unbiased estimated value of the Ec.

6. The method according to claim 5, wherein
the despreading the signals on the at least one path to obtain the second despreading value according to the spreading code of the physical channel to be estimated comprises:
according to the spreading code of the physical channel to be estimated, despreading signals on a path with the highest receiving power to obtain the second despreading value;
the performing secondary moment estimation according to the second despreading value to obtain the biased estimated value of the Ec comprises:
according to $$Ec' = \frac{1}{Q}\sum_{n=1}^{L/Q} B^2_{chscr,Q,j,l,n},$$

calculating a biased estimated value of the Ec, wherein Ec' is a biased estimated value of the Ec, $B_{chscr,Q,j,l,n}$ is a second despreading value, chscr is a despreading channel identifier, Q is a spreading factor of a physical channel to be estimated, j is a serial number of a channel code that is selected by the physical channel to be estimated, wherein $0 \leq j \leq Q-1$, l is a serial number of the path with the highest receiving power, n is a serial number of a symbol sequence that is used for despreading, L is the number of chips required for single estimation of the Ec, and L is a positive integral multiple of Q; and
the obtaining the unbiased estimated value of the Ec according to the biased estimated value of the Ec and the chip-level interference signal energy of the physical channel to be estimated comprises:
according to $Ec^* = Ec' - (L/Q) \times P_{noise,Ec}$, calculating an unbiased estimated value of the Ec, wherein $Ec^*$ is an unbiased estimated value of the Ec and $P_{noise,Ec}$ is chip-level interference signal energy of an acquired physical path to be estimated.

* * * * *